US011847805B2

(12) United States Patent
Liu et al.

(10) Patent No.: US 11,847,805 B2
(45) Date of Patent: Dec. 19, 2023

(54) METHOD FOR STITCHING IMAGES OF CAPSULE ENDOSCOPE, ELECTRONIC DEVICE AND READABLE STORAGE MEDIUM

(71) Applicants: ANKON TECHNOLOGIES CO., LTD, Wuhan (CN); ANX IP HOLDING PTE. LTD., Singapore (SG)

(72) Inventors: Hui Liu, Wuhan (CN); Hang Zhang, Wuhan (CN); Wenjin Yuan, Wuhan (CN); Zhiwei Huang, Wuhan (CN); Hao Zhang, Wuhan (CN)

(73) Assignees: ANKON TECHNOLOGIES CO., LTD., Wuhan (CN); ANX IP HOLDING PTE. LTD., Singapore (SG)

( * ) Notice: Subject to any disclaimer, the term of this patent is extended or adjusted under 35 U.S.C. 154(b) by 0 days.

(21) Appl. No.: 17/921,102

(22) PCT Filed: Apr. 23, 2021

(86) PCT No.: PCT/CN2021/089378
§ 371 (c)(1),
(2) Date: Oct. 24, 2022

(87) PCT Pub. No.: WO2021/213508
PCT Pub. Date: Oct. 28, 2021

(65) Prior Publication Data
US 2023/0123664 A1    Apr. 20, 2023

(30) Foreign Application Priority Data
Apr. 24, 2020    (CN) .......................... 202010330852.2

(51) Int. Cl.
*G06V 10/00*    (2022.01)
*G06V 10/10*    (2022.01)
(Continued)

(52) U.S. Cl.
CPC ................ *G06V 10/16* (2022.01); *G06T 5/20* (2013.01); *G06T 5/50* (2013.01); *G06T 7/11* (2017.01);
(Continued)

(58) Field of Classification Search
CPC ......... G06T 2207/10068; G06T 3/4038; G06T 2200/32; G06T 2207/10016;
(Continued)

(56) References Cited

U.S. PATENT DOCUMENTS

| 10,776,902 B2 * | 9/2020 | Bergen ................ G06V 10/507 |
| 2013/0083177 A1 | 4/2013 | Corso et al. |
| 2015/0045619 A1 * | 2/2015 | Kumar ............... G02B 23/2484 |
| | | 600/109 |

FOREIGN PATENT DOCUMENTS

WO   WO-2016044624 A1 *   3/2016   ......... A61B 1/00045

OTHER PUBLICATIONS

T. Bergen and T. Wittenberg, "Stitching and Surface Reconstruction From Endoscopic Image Sequences: A Review of Applications and Methods," in IEEE Journal of Biomedical and Health Informatics, vol. 20, No. 1, pp. 304-321, Jan. 2016, doi: 10.1109/JBHI.2014. 2384134.*

(Continued)

*Primary Examiner* — Li Liu
(74) *Attorney, Agent, or Firm* — Treasure IP Group, LLC

(57) ABSTRACT

A method for stitching images of a capsule endoscope, an electronic device, and a readable storage medium are provided. The method comprises: performing image rectification and circular edge masking on original images to form (Continued)

pre-processed images, and performing image enhancement (S1); completing detection and pairing of feature points (S2); calculating a transformation model of all pre-processed images to a same optimal plane according to a set of the feature points (S3); performing projective transformation for each enhanced image to a same coordinate system (S4); and stitching images according to an obtained sequence to form a fused image for output (S5), thus expanding the field of view of a single image of the capsule endoscope.

11 Claims, 5 Drawing Sheets

(51) Int. Cl.
    *G06T 7/11*     (2017.01)
    *G06V 10/74*     (2022.01)
    *G06V 10/44*     (2022.01)
    *G06T 5/20*     (2006.01)
    *G06T 5/50*     (2006.01)

(52) U.S. Cl.
    CPC ............ *G06V 10/44* (2022.01); *G06V 10/761* (2022.01); *G06T 2207/10068* (2013.01); *G06T 2207/20016* (2013.01); *G06T 2207/20221* (2013.01)

(58) Field of Classification Search
    CPC . G06T 2207/20016; G06T 2207/20221; G06T 2207/30004; G06V 10/16; G06V 10/443
    See application file for complete search history.

(56) References Cited

OTHER PUBLICATIONS

G. A. Puerto-Souza and G. -L. Mariottini, "A Fast and Accurate Feature-Matching Algorithm for Minimally-Invasive Endoscopic Images," in IEEE Transactions on Medical Imaging, vol. 32, No. 7, pp. 1201-1214, Jul. 2013, doi: 10.1109/TMI.2013.2239306.*

Münzer, Bernd, Klaus Schoeffmann, and Laszlo Böszörmenyi. "Content-based processing and analysis of endoscopic images and videos: A survey." Multimedia Tools and Applications 77 (2018): 1323-1362.*

Rongrong Hu. Research on Endoscopic Image Mosaic Technology for Minimally Invasive Surgery. MS thesis. University of Electronic Science and Technology of China, 2018.

Yuhang Mei. Treatment of capsule endoscopic image mask based on human visual system. MS thesis. Huazhong University of Science and Technology, 2017.

Zunlin Fan, et al. Method for infrared image with brightness preservation and detail enhancement. Journal of Central South University: Science and Technology, 2016, 47(6), 1967-1972.

Wenxia Bao, et al. Image mosaicking based on minimum spanning tree and TPS transformation model. Chinese Journal of Scientific Instrument, 2010(5), 1070-1075.

* cited by examiner

METHOD FOR STITCHING IMAGES OF CAPSULE ENDOSCOPE, ELECTRONIC DEVICE AND READABLE STORAGE MEDIUM

CROSS-REFERENCES TO RELATED APPLICATION

This application is a national stage application for PCT/CN2021/089378, filed on Apr. 23, 2021, which further claims priority to the Chinese patent application filed on Apr. 24, 2020, with the application number 202010330852.2 and the invention title "METHOD FOR STITCHING IMAGES OF CAPSULE ENDOSCOPE, ELECTRONIC DEVICE AND READABLE STORAGE MEDIUM", the entire contents of both applications are incorporated in this application by reference.

FIELD OF INVENTION

The present invention relates to the field of medical device imaging, and more particularly to a method for stitching images of a capsule endoscope, an electronic device and a readable storage medium.

BACKGROUND

Capsule endoscope is a medical device that integrates core components such as a camera and a wireless transmission antenna into a capsule that can be swallowed by a subject. As swallowed into the body of the subject, the capsule endoscope captures images in the digestive tract while transmitting the images to an external receiving device for review and evaluation by a physician.

Due to the limitation of size and power consumption of the capsule endoscope, in the prior art, the resolution of the captured images and the depth of field of the captured images are limited. As a result, the field of view for images observation is limited, and it is difficult for the physician to identify the specific location of a lesion and see clearly the overall condition of gastrointestinal mucosa based on a single image.

SUMMARY OF THE INVENTION

To solve the above technical problems, a method for stitching images of a capsule endoscope, an electronic device and a readable storage medium are provided.

According to an aspect of the present invention, there is provided a method for stitching images of a capsule endoscope, comprising: obtaining original images, forming pre-processed images by performing image rectification and circular edge masking on each original image; and performing image enhancement on the pre-processed images to form enhanced images;

completing detection and pairing of feature points in the pre-processed images;

calculating a transformation model of all pre-processed images to a same optimal plane according to a set of the feature points;

performing projective transformation for each enhanced image separately according to a transformation relation of the transformation model, to transform coordinate transformed images corresponding to all the enhanced images to a same coordinate system and form a plurality of images to be stitched, and obtaining new coordinate values corresponding to each image to be stitched in the coordinate system; and stitching the images to be stitched in sequence in the same coordinate system according to the sequence of corresponding original images obtained, and forming a fused image for output.

In one embodiment, the circular edge masking comprises:

calculating a distance from each pixel point in the original image after image rectified to the center of the rectified original image;

determining whether the distance of each pixel point is located in a circle with the center of the rectified original image as the center and r as the radius;

marking the pixel points in the circle as 1, and marking other pixel points as 0, and forming a circular mask; and retaining the pixel points marked as 1 to form a pre-processed image;

wherein $r \in [0.4583L, 0.707L]$, and L denotes the length of the short side of the rectified original image.

In one embodiment, performing image enhancement on pre-processed images to form enhanced images specifically comprises:

extracting a brightness layer and a detail layer using guided filter in the RGB channels of the pre-processed image, respectively;

wherein the enhanced image is represented as: $I_c = \alpha_c \times light_c + \beta_c \times detail_c$, c represents a channel, c=[R, G, B], light represents the brightness layer, detail represents the detail layer, and $\alpha_c$ and $\beta_c$ are constants;

combining the R, G, and B channels to obtain the enhanced image.

In one embodiment, a non-rigid dense matching method is used to complete the detection and pairing of the feature points in the pre-processed images;

the non-rigid dense matching method specifically comprises:

constructing a multi-scale associated image pyramid from bottom up on the basis of correlations of adjacent pre-processed images;

extracting initial feature points from the topmost image of the constructed multi-scale associated image pyramid;

detecting layer by layer from the topmost image of the multi-scale associated image pyramid downward to obtain points corresponding to the initial feature points;

taking the detected points corresponding to the bottommost layer of the multi-scale associated image pyramid as the feature points, and pairing location points corresponding to the feature points in the previous pre-processed image and the next pre-processed image.

In one embodiment, constructing an associated image pyramid specifically comprises:

partitioning each two adjacent pre-processed images into $M_1$ non-overlapping square segments of the same size, denoting each segment of the previous pre-processed image by R, and denoting each segment of the next pre-processed image by R', wherein R and R' respectively comprise 4 sub-segments of the same size;

calculating correlations between R and R' in adjacent pre-processed images by formula 1 to obtain an associated image of the bottommost layer, and using the associated image of the bottommost layer as a first sub associated image;

based on the sub associated image of each layer, obtaining the sub associated image of an upper layer by formula 2;

$$sim(R, R') = \frac{1}{M_1^2} \sum_{i=0}^{M_1-1} \sum_{j=0}^{M_1-1} R_i R'_j; \qquad \text{formula 1}$$

$$C_{N,p}(p') = \frac{1}{M_2} \sum_{k=0}^{M_2-1} \max_{m' \in \theta_i} C_{N',p+S_{N,i}}(m'); \qquad \text{formula 2}$$

wherein, sim(R, R') denotes the correlation between R and R', $R_i$ denotes an element descriptor corresponding to each sub-segment in the pre-processed image with segment R, $R'_j$ denotes an element descriptor corresponding to each sub-segment in the pre-processed image with segment R', $C_{N,p}$(p') denotes the correlation between a small element with length N and center point p in the previous pre-processed image and a small element with length N' and center point p' in the next pre-processed image, $\theta_i$ denotes the neighborhood centered at p+$S_{N,i}$ in a selected sub associated image, $S_{N,i}$ denotes a distance from an i-th neighborhood to the center point p, m' denotes a center point of the neighborhood of the center point p', $M_1$ is the number of square segments of the associated image of the bottommost layer (the first sub associated image), $M_2$ is the number of square segments of the sub associated image of the upper layer, $M_1$, $M_2$, N, and N' are positive integers, and the value of N' is correlated with $M_2$.

In one embodiment, obtaining the element descriptor comprises:
step T1, performing Gaussian filtering on each pre-processed image with a predetermined Gaussian kernel $r_1$ as a radius, to form an image I_denoise;
step T2, in the image I_denoise, calculating the gradient of each pixel location point and its projection in F directions, counting the location of each pixel point in a 3*3 neighborhood of each pixel point by the angle of F directions, taking the gradient as the weight of each direction to obtain F-dimensional vector information of each pixel point, weighting the vector information corresponding to the pixel points of each sub-segment to synthesize into the F-dimensional vector information, and using the synthesized F-dimensional vector information as the element descriptor of the current sub-segment;
step T3, performing Gaussian filtering on each element descriptor with a predetermined Gaussian kernel $r_2$;
step T4, using Sigmoid function to restrict each element descriptor processed in step T3;
step T5, assigning a constant value µ for each element descriptor, updating each element descriptor to an F-dimensional grayscale value and the constant value µ, and processing by normalization for the calculation of the first sub associated image.

In one embodiment, after completing detection and pairing of feature points in the pre-processed images, the method further comprises: eliminating incorrect matching pairs, the eliminated incorrect matching pairs comprising a first eliminating incorrect matching pair;
the first eliminating incorrect matching pair specifically comprises:
finding a previous pre-processed image and a next pre-processed image corresponding thereto based on feature point matching to obtain a first feature matching point corresponding to the feature point in the previous pre-processed image and a second feature matching point corresponding to the feature point in the next pre-processed image, respectively;
determining whether grayscale values of the first feature matching point and the second feature matching point corresponding to the same current feature point are both within corresponding preset grayscale value ranges; determining that the first feature matching point and the second feature matching point corresponding to the current feature point are valid when the grayscale values of the first feature matching point and the second feature matching point corresponding to the same current feature point are both within the corresponding preset grayscale value ranges; determining that the first feature matching point and the second feature matching point corresponding to the current feature point are invalid when the grayscale values of the first feature matching point and the second feature matching point corresponding to the same current feature point are not within the corresponding preset grayscale value ranges at the same time, and eliminating the first feature matching point and the second feature matching point.

In one embodiment, the eliminated incorrect matching pairs further comprising a second eliminating incorrect matching pair; the second eliminating incorrect matching pair specifically comprises: identifying all interior points using RANSAC fitting model, while eliminating exterior points that do not conform to the model.

In one embodiment, after performing projective transformation for each enhanced image separately according to a transformation relation of the transformation model, to transform coordinate transformed images corresponding to all the enhanced images to a same coordinate system, the method further comprises:
step N1, constructing a deformation function using a TPS model based on the coordinate transformed images, and calculating an error value between each element in the coordinate transformed image processed by the deformation function and the corresponding element in the coordinate transformed image originally;
step N2, determining whether the maximum error value in the coordinate transformed image is less than a preset error threshold, marking a current coordinate transformed image as a small error image when the maximum error value in the corresponding coordinate transformed image is less than the preset error threshold, and marking the current coordinate transformed image as a large error image when the maximum error value in the corresponding coordinate transformed image is not less than the preset error threshold;
step N3, determining whether the percentage of the number of small error images in a total number of all images is less than a preset matching threshold,
designating the coordinate transformed image as the image to be stitched after deforming the coordinate transformed image using the deformation function constructed by the TPS model when the percentage of the number of small error images in the total number of all images is less than the preset matching threshold;
designating the coordinate transformed image as the image to be stitched when the percentage of the number of small error images in the total number of all images is not less than the preset matching threshold.

In one embodiment, after the step N3, the method further comprises: projecting the image to be stitched by an equirectangular projection to the optimal projection plane using image interpolation for coordinate information in the image to be stitched to form a new image to be stitched.

In one embodiment, stitching the images to be stitched in sequence in the same coordinate system according to the sequence of corresponding original images obtained and forming a fused image for output specifically comprises:

obtaining previous images to be fused in sequence according to the sequence of original images obtained, with the first image to be fused being the first image to be stitched;

calculating an overlapping area between the image to be stitched that appears after the previous image to be fused and the current image to be fused according to the sequence of original images obtained, retaining pixel values of a non-overlapping area, and updating the pixel values of the overlapping area using formula 3 to form a new previous image to be fused, until the last image to be stitched is fused to the previous image to be fused, to form a final fused image for output;

$$Pix1 = im1\frac{dist1}{dist1 + dist2} + im2\frac{dist2}{dist1 + dist2},\quad \text{formula 3}$$

where, Pix1 represents the pixel value of the overlapping area in the new previous image to be fused after each image fusion or in the final fused image; im1 represents the pixel value of the overlapping area in the previous image to be fused and im2 represents the pixel value of the overlapping area in the next image to be stitched; dist1 represents a distance from a pixel point of the overlapping area in the previous image to be fused to the boundary of the current image to be fused; dist2 represents a distance from the pixel point of the overlapping area in the image to be stitched after the previous image to be fused to the boundary of the current image to be stitched.

According to another aspect of the present invention, there is provided an electronic device, comprising a storage medium and a processor, the storage medium storing a computer program that runs on the processor, the processor executing the computer program to implement the steps in the method for stitching images of the capsule endoscope as described above.

According to still another aspect of the present invention, there is provided a computer-readable storage medium that stores a computer program, the computer program being executed by a processor to implement the steps in the method of stitching images of the capsule endoscope as described above.

The method for stitching images of the capsule endoscope, electronic device and readable storage medium disclosed in the present invention can stitch multiple images captured consecutively into one image for output, and expand the field of view of a single image of the capsule endoscope.

DETAILED DESCRIPTION

The present invention will be described in detail below with reference to the accompanying drawings and preferred embodiments. However, the embodiments are not intended to limit the present invention, and the structural, method, or functional transformations made by those skilled in the art in accordance with the embodiments are included in the scope of the present invention.

Figure 1:
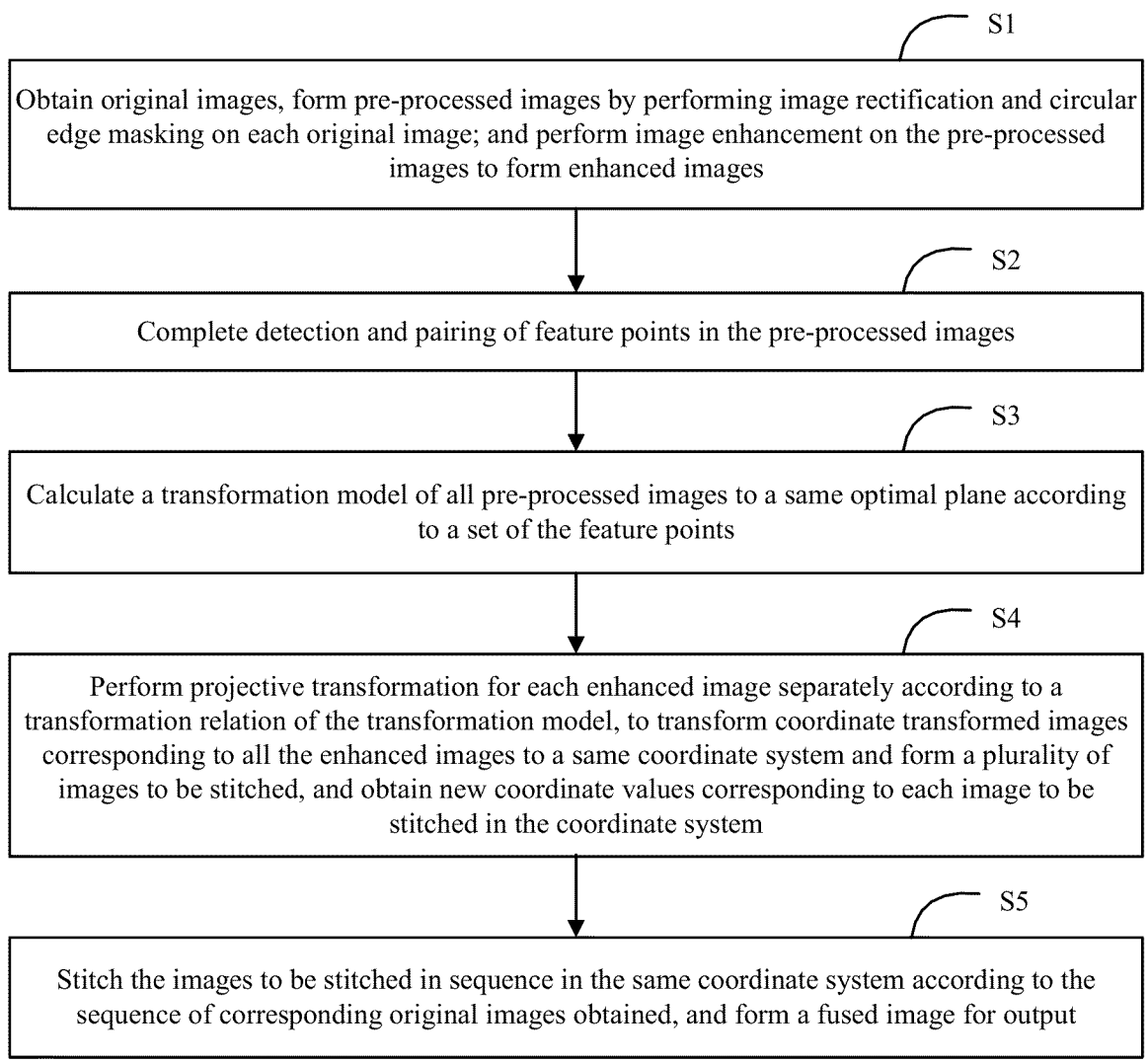
FIG. 1 illustrates an exemplary flowchart for a method for stitching images of a capsule endoscope according to a first embodiment of the present invention.

Referring to FIG. 1, a method for stitching images of a capsule endoscope is provided in a first embodiment of the present invention, the method comprising:

step S1, obtaining original images, forming pre-processed images by performing image rectification and circular edge masking on each original image; and performing image enhancement on the pre-processed images to form enhanced images;

step S2, completing detection and pairing of feature points in the pre-processed images;

step S3, calculating a transformation model of all pre-processed images to a same optimal plane according to a set of the feature points;

step S4, performing projective transformation for each enhanced image separately according to a transformation relation of the transformation model, to transform coordinate transformed images corresponding to all the enhanced images to a same coordinate system and form a plurality of images to be stitched, and obtaining new coordinate values corresponding to each image to be stitched in the coordinate system; and step S5, stitching the images to be stitched in sequence in the same coordinate system according to the sequence of corresponding original images obtained, and forming a fused image for output.

For ease of description, the above description is numbered by steps S1-S5, but it should be noted that in the above steps, "performing image enhancement on the pre-processed images to form enhanced images" in step S1 is not limited to be completed in step S1, but as long as it is completed before step S4, the technical effect of the present invention can be ensured.

For step S1, due to a special imaging means of the capsule endoscope, there is often a barrel distortion of the original image caused by the characteristics of convex lens of a camera of the capsule endoscope. In order to reduce the impact of distortion on image stitching, the original image needs to be rectified in step S1. In the prior art, there are a plurality of means for image rectification, which are not described here. In specific embodiments of the present invention, for example, the original image can be rectified by means of radial distortion rectification.

Further, since a distorted image is severely distorted at the edges far from the center of the image, circular edge masking is applied to the original image after image rectified to form a pre-processed image. In this way, the effect of the edges on the overall image is further removed.

Figure 2:
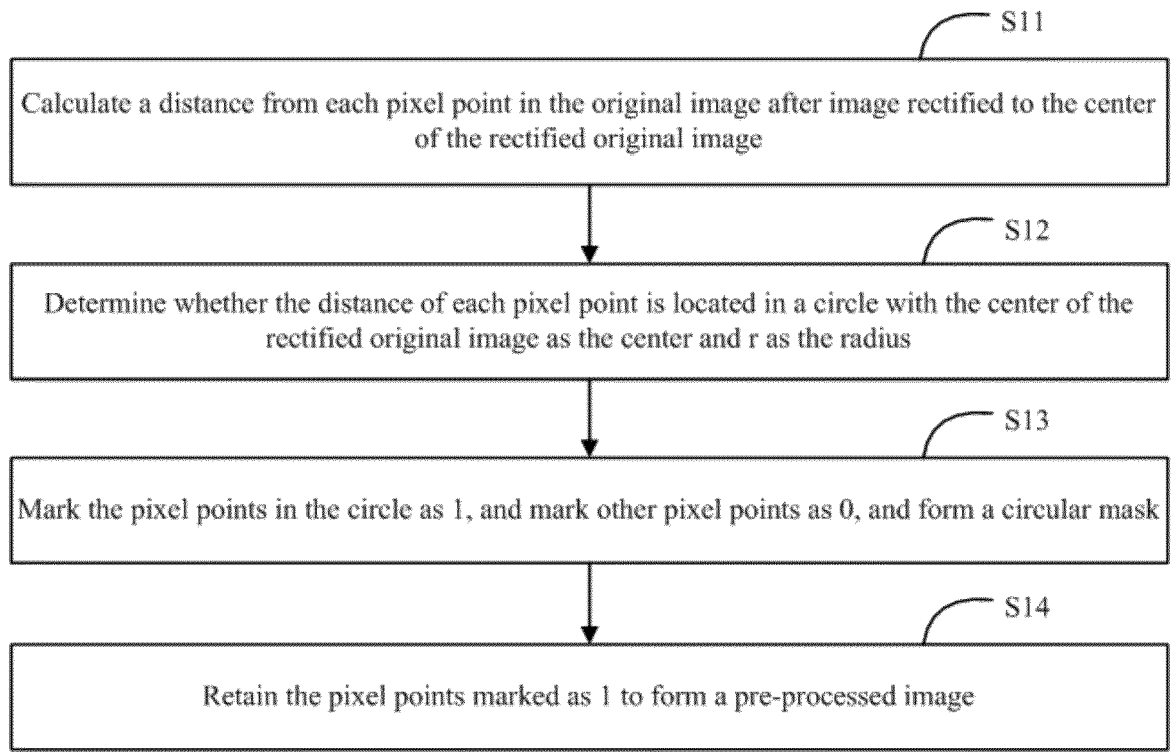
FIG. 2, FIG. 3 and FIG. 7 respectively illustrate an exemplary flowchart for one of the steps in FIG. 1 according to a preferred embodiment.

In a preferred embodiment of the present invention, referring to FIG. 2, the circular edge masking specifically comprises: step S11, calculating a distance from each pixel in the original image after image rectified to the center of the rectified original image; step S12, determining whether the distance of each pixel point is located in a circle with the center of the rectified original image as the center and r as the radius; step S13, marking the pixel points in the circle as 1, and marking other pixel points as 0, and forming a circular mask; and step S14, retaining the pixel points marked as 1 to form a pre-processed image; where r∈[0.4583L,0.707L] and L denotes the length of the short side of the rectified original image.

Usually, the original image is a square and its length of the side can be denoted by L, i.e., the original image is an image of size L*L. In a specific example of the present invention, the size of the rectified original image is 480*480 in pixels; a preferred r is taken a value of 260.

During image stitching, smoothing effect on images often makes a stitched panoramic image lose a lot of details. In order to solve this problem, in the preferred embodiments of the present invention, enhanced images are used for image fusion during the image stitching, therefore, in some steps, it is necessary to perform image enhancement on the pre-processed images to form enhanced images.

In the embodiments of the present invention, performing image enhancement on pre-processed images to form enhanced images specifically comprises: extracting a brightness layer and a detail layer using guided filter in the RGB channels of the pre-processed image, respectively; the enhanced image $I_c$ is represented as: $I_c = \alpha_c \times light_c + \beta_c \times detail_c$, where c represents a channel, c=[R, G, B], light represents the brightness layer, detail represents the detail layer, and $\alpha_c$ and $\beta_c$ are constants; combining the R, G, and B channels to obtain the enhanced image.

In a specific example of the present invention, the value range of $\alpha_c$ is [−6, 6], and the value range of $\beta_c$ is [−5, 5]. Preferably, $\alpha_c = 1.75$, $\beta_c = 3$.

Figure 3:
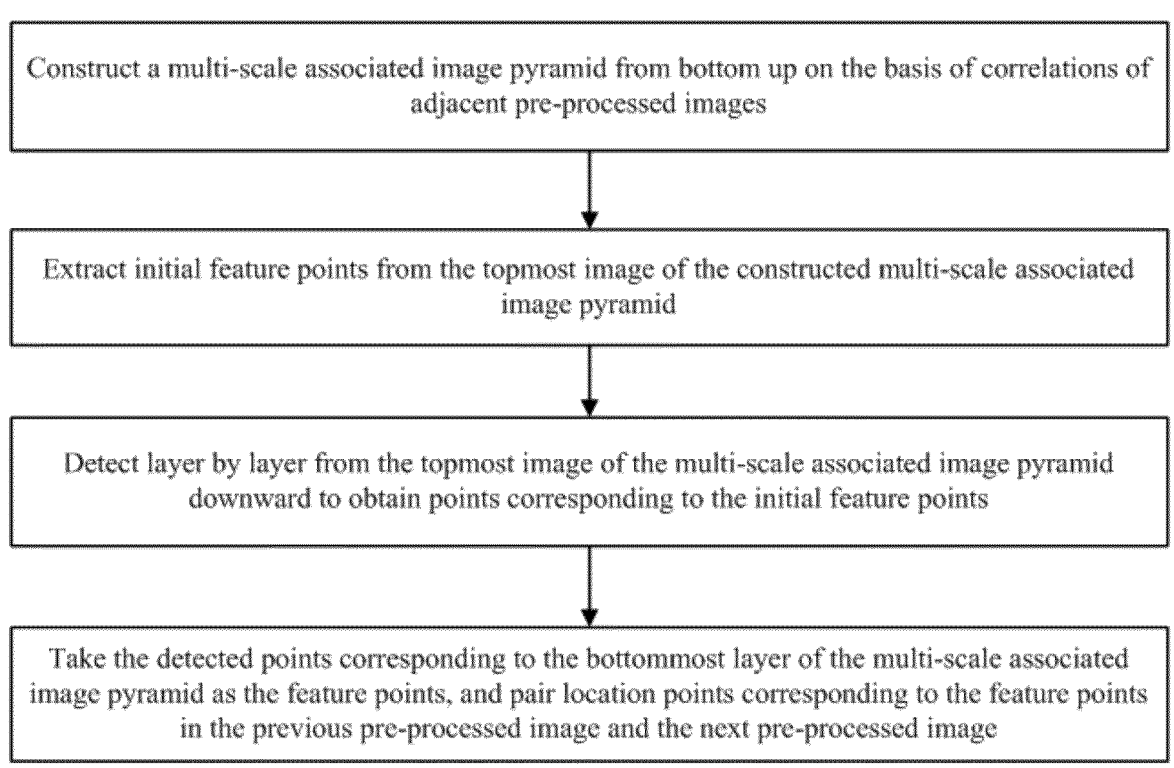

For step S2, referring to FIG. 3, in a preferred embodiment of the present invention, a non-rigid dense matching method is used to complete the detection and pairing of the feature points in the pre-processed images; the non-rigid dense matching method specifically comprises: constructing a multi-scale associated image pyramid from bottom up on the basis of correlations of adjacent pre-processed images; extracting initial feature points from the topmost image of the constructed multi-scale associated image pyramid; detecting layer by layer from the topmost image of the multi-scale associated image pyramid downward to obtain points corresponding to the initial feature points; taking the detected points corresponding to the bottommost layer of the multi-scale associated image pyramid as the feature points, and pairing location points corresponding to the feature points in the previous pre-processed image and the next pre-processed image.

It should be noted that in this specific example, the feature points can be detected layer by layer from the top layer of the multi-scale associated image pyramid downward; after the feature points are detected at the top layer, aggregation process at the current layer is withdrawn, and the corresponding feature points in a sub associated image are found and retrieved layer by layer downward to obtain the final desired feature points.

Preferably, the feature points are detected by, retrieving location points with a larger similarity value as feature points in the associated image of the current layer, and the top P % of the ranking of similarity values from largest to smallest can be set according to actual needs. For example, P is taken as [10, 50].

In the embodiments of the present invention, constructing an associated image pyramid specifically comprises: step S21, partitioning each two adjacent pre-processed images into $M_1$ non-overlapping square segments of the same size, denoting each segment of the previous pre-processed image by R, and denoting each segment of the next pre-processed image by R', where R and R' respectively comprise 4 sub-segments of the same size; step S22, calculating correlations between R and R' in adjacent pre-processed images by formula 1 to obtain an associated image of the bottommost layer, and using the associated image of the bottommost layer as a first sub associated image; step S23, based on the sub associated image of each layer, obtaining the sub associated image of an upper layer by formula 2, $$sim(R, R') = \frac{1}{M_1^2} \sum_{k=0}^{M_1-1} \sum_{j=0}^{M_1-1} R_i R'_j, \quad \text{formula 1}$$

$$C_{N,p}(p') = \frac{1}{M_2} \sum_{k=0}^{M_2-1} \max_{m' \in \theta_i} C_{N', p+S_{N,i}}(m'), \quad \text{formula 2}$$

where, sim(R, R') denotes the correlation between R and R', $R_i$ denotes an element descriptor corresponding to each sub-segment in the pre-processed image with segment R, $R'_j$ denotes an element descriptor corresponding to each sub-segment in the pre-processed image with segment R', $C_{N,p}$ (p') denotes the correlation between a small element with length N and center point p in the previous pre-processed image and the small element with length N' and center point p' in the next pre-processed image, $\theta_i$ denotes the neighborhood centered at $p+S_{N,i}$ in a selected sub associated image, $S_{N,i}$ denotes a distance from an i-th neighborhood to the center point p, m' denotes a center point of the neighborhood of the center point p', $M_1$ is the number of square segments of the associated image of the bottommost layer (the first sub associated image), $M_2$ is the number of square segments of the sub associated image of the upper layer, $M_1$, $M_2$, N, and N' are positive integers, and the value of N' is correlated with $M_2$. Under the premise of not exceeding ¼ of the image size, N=(4, 8 . . . $2^n$).

In a preferred embodiment of the present invention, the value of $M_1$ is one of 2, 4, and 9, the value of $M_2$ is one of 4, 9, and 16, and the value of N' is determined by $M_2$. When $M_2=4$, N'=N/2; when $M_2=9$, N'=N/3; when $M_2=16$, N'=N/4, and so on.

In a specific embodiment of the present invention, $M_1=M_2=4$ is taken; correspondingly, formula 1 can be expressed as:

$$sim(R, R') = \frac{1}{16} \sum_{k=0}^{3} \sum_{j=0}^{3} R_i R'_j,$$

Formula 2 can be expressed as:

$$C_{N,p}(p') = \frac{1}{4} \sum_{k=0}^{3} \max_{m' \in \theta_i} C_{\frac{N}{2}, p+S_{N,i}}(m').$$

As above, for step S22, the correlation matrix between any segment in the previous pre-processed image and all segments in the adjacent next pre-processed image is obtained to form the associated image of the bottommost layer, and each associated image of the bottommost layer is used as a first sub associated image. The number of associated images of the bottommost layer is $M_1$, and $M_1$ is the total number of segments included in any pre-processed image. For step 23, the small element with center point p in each current sub associated layer is replaced by the maximum value in the $\theta_i$ neighborhood of the small element with center point $p+S_{N,\,i}$ in its adjacent associated image of the upper layer, aggregating to form each sub associated image of the associated image pyramid.

Figure 4:
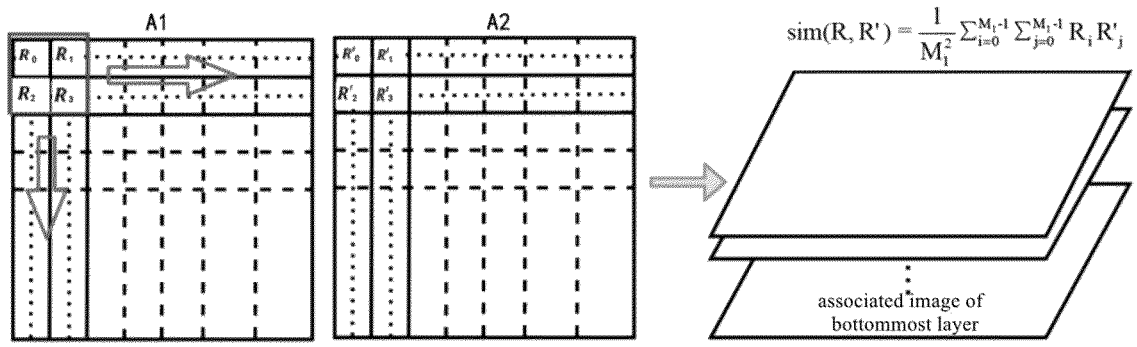
FIG. 4 and FIG. 5 respectively illustrate an structural diagram of a specific example for implementing the steps of the process shown in FIG. 3.

In a specific embodiment of the present invention, referring to FIG. 4, two adjacent pre-processed images are $A_1$ and $A_2$, each segment of $A_1$ and $A_2$ includes 4*4 pixel points, and each segment is partitioned into four 2*2 sub-segments. In this example, a segment of a first pre-processed image is denoted by R, including 4 sub-segments $R_j$, which are $R_0$, $R_1$, $R_2$, and $R_3$, and a segment of a second pre-processed image is denoted by R', including 4 sub-segments $R'_j$, which are $R'_0$, $R'_1$, $R'_2$, and $R'_3$. Correlations between each sub-segment in a segment selected by the rectangular box in the first pre-processed image and each segment in the second pre-processed image are calculated to obtain the associated image of the bottommost layer. Then, the rectangular box is slid along the arrow direction, and with each slide over one segment, an associated image of the bottom layer is obtained. After the first pre-processed image is traversed, the bottommost layer (first layer) of the associated image pyramid is finally obtained.

Figure 5:
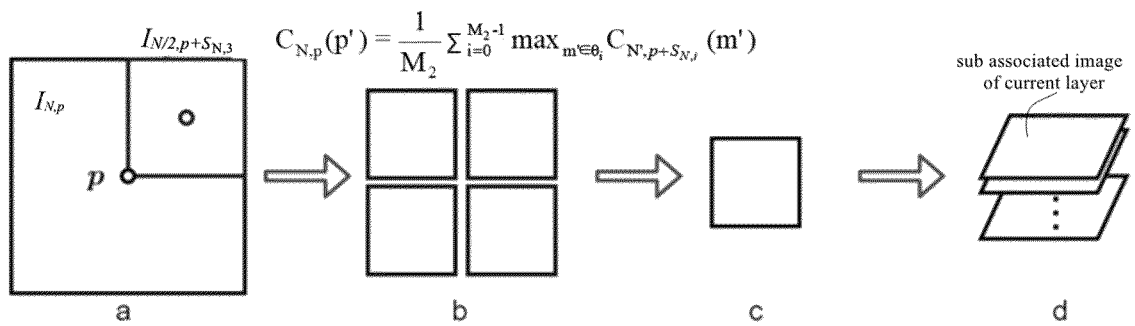

Referring to FIG. 5, the large rectangular box in image a represents a sub-segment of the sub associated image of the next layer, and the small rectangular box in the upper right corner represents the sub-segment at the corresponding position of the sub associated image of the upper layer. The maximum value of the neighborhood $\theta_s$ is selected in the small rectangular box of image a to obtain image b, and then the image b is averaged to obtain image c. The operation is performed for each layer of the sub associated image, and finally $M_2$ associated images of current layer (image d) are obtained, i.e., the associated image of upper layer relative to the sub associated image.

In the implementable embodiments of the present invention, the element descriptor can be one of a SIFT (Scale-invariant feature transform) descriptor, a Harris descriptor (corner point detection operator), and a LBP (Local Binary Patterns) descriptor. The SIFT descriptor, the Harris descriptor, and the LBP descriptor are all common feature detection operator.

Figure 6:
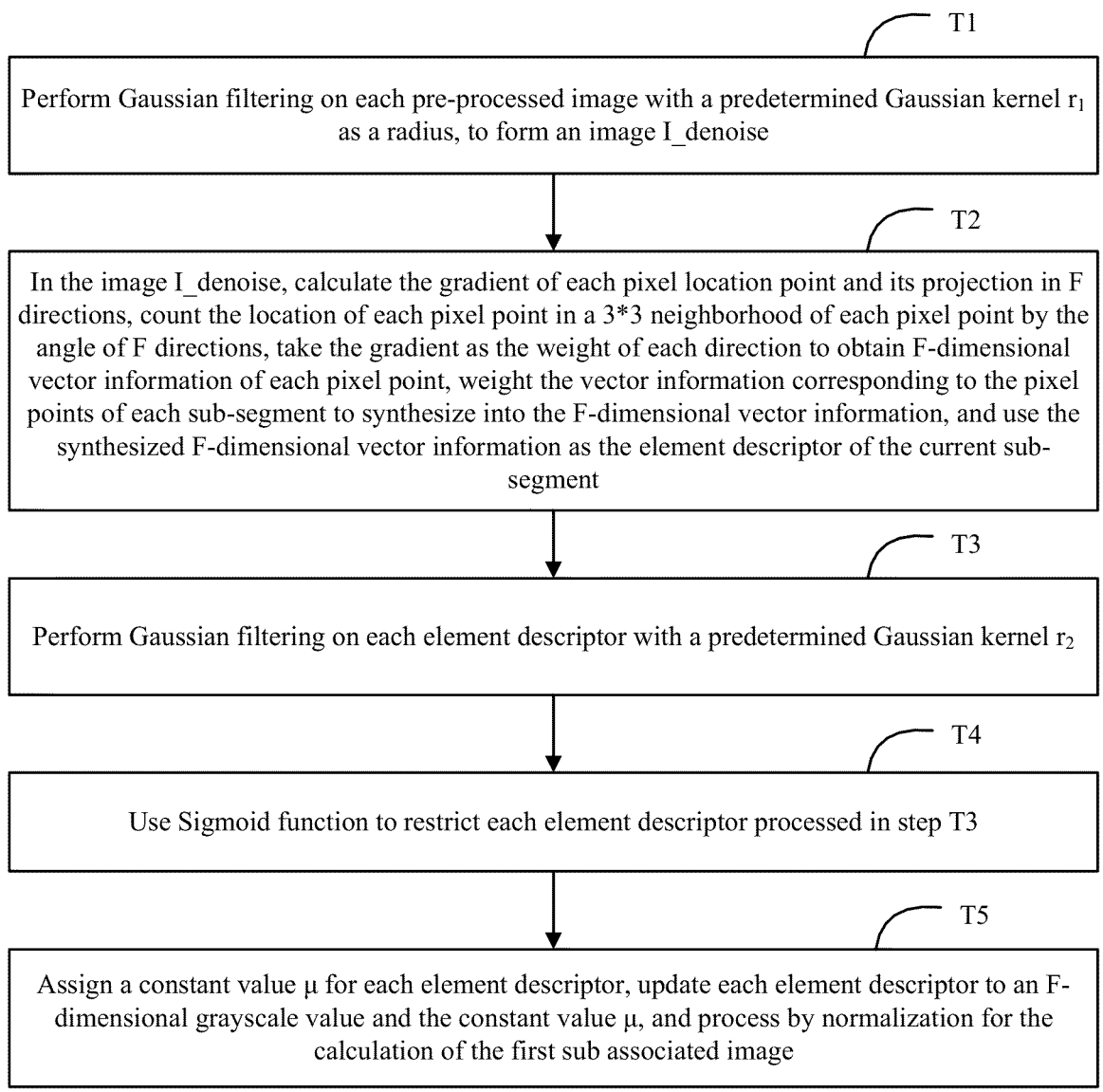
FIG. 6 illustrates an exemplary flowchart of a specific method of obtaining an element descriptor called in the step shown in FIG. 3.

In a preferred embodiment of the present invention, referring to FIG. 6, obtaining the element descriptor comprises: step T1, performing Gaussian filtering on each pre-processed image with a predetermined Gaussian kernel $r_1$ as a radius, to form an image I_denoise. Through the step, the noise caused during image capturing or JPEG compression can be reduced. Preferably, the range of $r_1$ is [0.2,1.5].

step T2, in the image I_denoise, calculating the gradient of each pixel location point and its projection in F directions, counting the location of each pixel in a 3*3 neighborhood of each pixel point by the angle of F directions, taking the gradient as the weight of each direction to obtain F-dimensional vector information of each pixel point, weighting the vector information corresponding to the pixel points of each sub-segment to synthesize into the F-dimensional vector information, and using the synthesized F-dimensional vector information as the element descriptor of the current sub-segment. In the step, every 360/F° is one direction, and 0-360° is divided into F directions. Preferably, the value range of F is [2,36]; for example, in the example shown in FIG. 2 above, each $R_i$ represents a small area of 2*2, and the vector information of all pixel points in each 2*2 area is weighted and synthesized into an F-dimensional (8-dimensional) vector information as the element descriptor of this sub-segment area.

Specifically, the calculation formulas for gradient and direction are as follows:

$$G_x(x, y) = H(x+1, y) - H(x-1, y),$$
$$G_y(x, y) = H(x, y+1) - H(x, y-1),$$
$$G(x, y) = \sqrt{G_x(x, y)^2 + G_y(x, y)^2},$$
$$\theta(x, y) = \tan^{-1}\left(\frac{G_y(x, y)}{G_x(x, y)}\right).$$

where, H(x,y) represents a pixel value at the coordinate point (x,y) in the image I_denoise; $G_x(x, y)$ represents the horizontal gradient value of the pixel point (x,y), and $G_y(x, y)$ represents the vertical gradient value of the pixel point (x,y); G(x, y) represents the gradient of the pixel point (x,y); $\theta(x, y)$ represents the gradient direction of the pixel point (x,y).

step T3, performing Gaussian filtering on each element descriptor with a predetermined Gaussian kernel $r_2$. The purpose of the step is to enhance the effect of the neighboring points close to each location point on the current element descriptor. Preferably, the value of $r_2$ is D/2, and D is the length of small element of the current layer.

step T4, using Sigmoid function to restrict each element descriptor processed in step T3. This step can exclude strong gradients caused by the influence of changing light. The Sigmoid function is a common function which is S-shaped function and aims to map variables to between 0 and 1.

step T5, assigning a constant value μ for each element descriptor, updating each element descriptor to an F-dimensional grayscale value and the constant value μ, and processing by normalization for the calculation of the first sub associated image. This step is used to reduce the influence of pixel points without grayscale values. The normalization in this step can be understood as mapping the element descriptor of F dimension+1 dimension (constant value μ) to between 0 and 1, so as to be referenced by the above step. In addition, the value range of μ is [0.05, 0.15], which will not be further described here.

In a preferred embodiment of the present invention, in order to improve the pairing accuracy, after completing the detection and pairing of feature points in the pre-processed images, the method further comprises: eliminating incorrect matching pairs, two pixel points corresponding to the same feature point in the adjacent images are called a matching pair.

In the following embodiments, one of the following two methods can be used to eliminate the incorrect matching pairs, or the following two methods can be used to eliminate the incorrect matching pairs one after the other. The two methods specifically comprise a first eliminating incorrect matching pair and a second eliminating incorrect matching pair.

In the preferred embodiment of the present invention, the following two methods are combined and used one after the other to eliminate the incorrect matching pairs.

First, the first eliminating incorrect matching pair is used. In this embodiment, feature matching pairs in the overexposed and overdark areas are removed, that is, the pixel points in the overexposed area and the overdark area are discarded. Specifically, the first eliminating incorrect matching pair comprises: finding a previous pre-processed image and a next pre-processed image corresponding thereto based on feature point matching to obtain a first feature matching point corresponding to the feature point in the previous pre-processed image and a second feature matching point corresponding to the feature point in the next pre-processed image, respectively; determining whether grayscale values of the first feature matching point and the second feature matching point corresponding to the same feature point are both within corresponding preset grayscale value ranges; when the grayscale values of the first feature matching point and the second feature matching point corresponding to the same current feature point are both within the corresponding preset grayscale value ranges, determining that the first feature matching point and the second feature matching point corresponding to the current feature point are valid; when the grayscale values of the first feature matching point and the second feature matching point corresponding to the same current feature point are not within the corresponding preset grayscale value ranges at the same time, determining that the first feature matching point and the second feature matching point corresponding to the current feature point are invalid, and eliminating the first feature matching point and the second feature matching point.

In the embodiments of the present invention, the grayscale value of the first feature matching point is G1, and the grayscale value of the second feature matching point is G2. The value range of G1 is [180,255], and the value range of G2 is [0,60]. For example, G1=200, G2=50.

After the first eliminating incorrect matching pair is performed, the second eliminating incorrect matching pair is performed. Specifically, the second eliminating incorrect matching pair specifically comprises: identifying all interior points using RANSAC fitting model, while eliminating exterior points that do not conform to the model.

RANSAC is the abbreviation of Random Sample Consensus, which is a commonly used mathematical model calculation method.

In various embodiments, the first eliminating incorrect matching pair and the second eliminating incorrect matching pair described above may be used separately, or in successive combinations.

For stomach images captured by a capsule endoscope, the shape is irregular and the trajectory is uncertain, which is prone to infinite stretching when stitching multiple images. Therefore, an equirectangular projection (ERP) is more suitable for multi-view stitching images of the capsule endoscope. Accordingly, in step S3, the transformation model of all pre-processed images to the same optimal plane is calculated; specifically, an optimal projection plane is calculated using the means of bundle adjustment for the set of obtained feature points to obtain the transformation model when the projection plane is optimal.

The means of bundle adjustment maps feature point coordinates to world point coordinates, and is a commonly used means for calculating transformation models.

Preferably, the calculation of the bundle adjustment uses a LM (Levenberg-Marquardt) algorithm, which uses simplified sparse variables to reduce the complexity of calculation and minimize projection error. It will not be further described here.

For step S4, after performing projective transformation for each enhanced image separately according to a transformation relation of the transformation model, the method further comprises: constructing a deformation function using a TPS model for the enhanced images after projective transformation, and calculating an error between the deformed image and the image before deformation; after eliminating the error, obtaining new coordinate values corresponding to each enhanced image in a new coordinate system.

Figure 7:
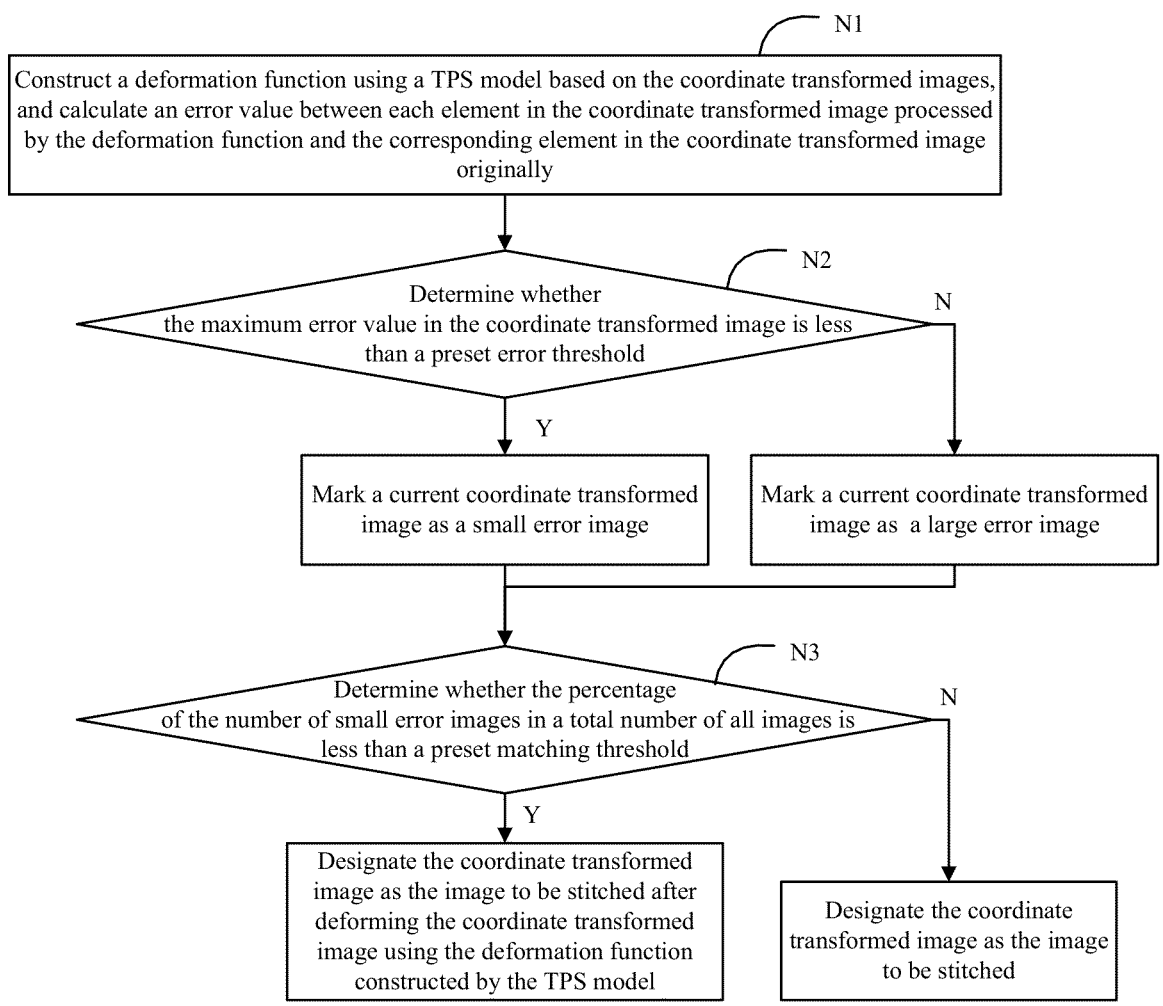

Specifically, referring to FIG. 7, the step S4 specifically comprises: step N1, constructing a deformation function using a TPS model based on the coordinate transformed image, and calculating an error value between each element in the coordinate transformed image processed by the deformation function and the corresponding element in the coordinate transformed image originally; step N2, determining whether the maximum error value in the corresponding coordinate transformed image is less than a preset error threshold, marking a current coordinate transformed image as a small error image when the maximum error value in the corresponding coordinate transformed image is less than the preset error threshold, and marking the current coordinate transformed image as a large error image when the maximum error value in the corresponding coordinate transformed image is not less than the preset error threshold; step N3, determining whether the percentage of the number of small error images in a total number of all images is less than a preset matching threshold, designating the coordinate transformed image as the image to be stitched after deforming the coordinate transformed image using the deformation function constructed by the TPS model when the percentage of the number of small error images in the total number of all images is less than the preset matching threshold; designating the coordinate transformed image as the image to be stitched when the percentage of the number of small error images in the total number of all images is not less than the preset matching threshold.

In the prior art, TPS (Thin Plate Spline) is a thin plate spline function used to find an optimal curved surface that deforms the image, and is commonly used to perform non-rigid deformation of the image. The deformation function of the TPS model is:

$$g(x, y) = \sum_{i=1}^{n} \omega_i \varphi_i(x) + \alpha_1 x + \alpha_2 x + \alpha_3 x;$$

where, $\omega_i$, $\alpha_1$, $\alpha_2$, $\alpha_3$ represent parameters of the deformation function, which can be solved according to the TPS model; $\varphi_i(x)$ represents a radial basis function, which is a commonly used function: the value depends only on a real-valued function of the distance from the origin. It should be noted that the deformation function of the TPS model is a prior art, and accordingly, a new coordinate transformed image obtained by deforming the coordinate transformed image with the deformation function of the TPS model can also be derived from the prior art, which will not be discussed in detail here.

In the deformation function of TPS model, according to the calculated g(x, y), a new coordinate information can be obtained, for example, for any point $(x_0, y_0)$ in an image $I_q$ has the following relationship with its corresponding point (x, y) in the deformed image:

$$\begin{cases} x_0 = x - g(x, y) \\ y_0 = y - h(x, y) \end{cases}, \text{where, } g(x, y) = (g(x, y), h(x, y))^T, g(x, y), h(x, y)$$

represent the deformation of the image in horizontal direction and vertical direction respectively, T is the transpose symbol.

In step N2 of the present invention, the error value of each pixel point in the coordinate transformed image corresponding to the pixel point of its deformed image can be obtained by the deformation function, and further, the magnitude of the error value can be used to determine whether the image can be excessively deformed if the deformation operation is performed on the coordinate transformed image, so as to select whether to make local adjustments to the coordinate transformed image.

Preferably, the preset error threshold is in the range of [80,200], for example, the preset error threshold is set to 80. That is, corresponding to each coordinate transformed image, the deformation function constructed using the TPS model is used to obtain the error value between the pixel point with the largest deformation and its deformed pixel point, and when the error value is less than the preset error threshold, the image is identified as a small error image, otherwise, when the error value is not less than the preset error threshold, the image is identified as a large error image.

In step N3 of the present invention, the preset matching threshold is in the range of [60%, 90%]. For example, the preset matching threshold is set to 80%, the total number of coordinate transformed images is 5, and after step N2 determination, 4 of them are small error images and 1 image is large error image, then the percentage of small error images to the total number of all images=⅘*100%=80%, which is equal to the preset matching threshold. Therefore, there is no need to deform the coordinate transformed image; on the contrary, if 4 images are large error images and 1 image is small error image, the percentage of small error images to the total number of all images=⅕*100%=20%, which is less than the preset matching threshold, so the coordinate transformed image needs to be deformed using the deformation function constructed by the TPS model, and in the following steps, the deformed image is used as the basis for image processing.

In a preferred embodiment of the present invention, after the step N3, the method further comprises: projecting the image to be stitched by an equirectangular projection to the optimal projection plane using image interpolation for the coordinate information in the image to be stitched to form a new image to be stitched.

The image by the equirectangular projection refers to: performing a transformation of the equirectangular projection of the coordinates of each pixel point in the image to be stitched after step N3, and then mapping the image to the same coordinate system using the transformation model.

For step S5, the purpose is to fuse the images using a certain fusion strategy, aiming to make the panoramic image natural and without stitching seam.

In one embodiment of the present invention, in order to eliminate stitching traces, a fusion method with weighted smoothing is used to achieve image fusion. In a specific embodiment of the present invention, image fusion with multi-view stitching is used; image fusion with multi-view stitching refers to that the first W−1 images are fused with the W-th image, and W is the number of the sequence of images to be stitched.

It can be understood that when calculating the overlapping area of two images to be fused, since the images to be fused are the images after projective transformation in the same coordinate system, only valid pixel points in the two images to be fused need to be operated with to obtain the overlapping area of the two images.

Specifically, the step S5 comprises: obtaining previous images to be fused in sequence according to the sequence of original images obtained, with the first image to be fused being the first image to be stitched;

calculating an overlapping area between the image to be stitched that appears after the previous image to be fused and the current image to be fused according to the sequence of original images obtained, retaining pixel values of a non-overlapping area, and updating the pixel values of the overlapping area using formula 3 to form a new previous image to be fused, until the last image to be stitched is fused to the previous image to be fused, to form the final fused image for output;

Formula 3:

$$Pi \times 1 = im1 \frac{dist1}{dist1 + dist2} + im2 \frac{dist2}{dist1 + dist2},$$

where, Pix1 represents the pixel value of the overlapping area in the new previous image to be fused after each image fusion or in the final fused image; im1 represents the pixel value of the overlapping area in the previous image to be fused and im2 represents the pixel value of the overlapping area in the next image to be stitched; dist1 represents a distance from a pixel point of the overlapping area in the previous image to be fused to the boundary of the current image to be fused; dist2 represents a distance from the pixel point of the overlapping area in the image to be stitched after the previous image to be fused after the previous image to be fused to the boundary of the current image to be stitched.

Further, in an embodiment of the present invention, there is provided an electronic device, comprising a storage medium and a processor, the storage medium storing a computer program that can run on the processor, the processor executing the program to implement the steps in the method for stitching images of the capsule endoscope as described above.

Further, in an embodiment of the present invention, there is provided a computer-readable storage medium that stores a computer program, the computer program being executed by a processor to implement the steps in the method for stitching images of the capsule endoscope as described above.

Figure 8:
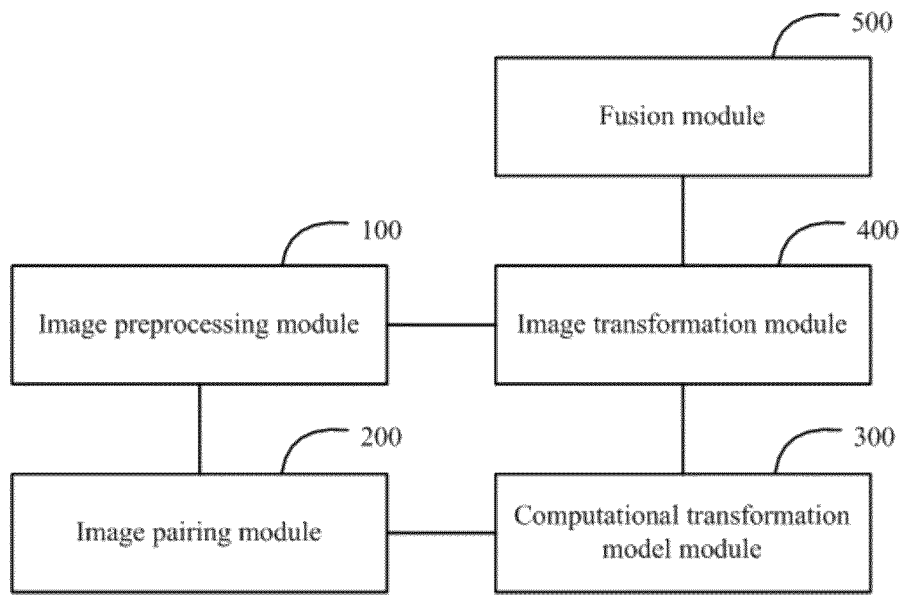
FIG. 8 illustrates a schematic diagram of modules of an image stitching system for images of the capsule endoscope according to an embodiment of the present invention.

Referring to FIG. 8, in an embodiment of the present invention, there is provided an image stitching system for stitching images of the capsule endoscope, the system comprising: an image preprocessing module 100, an image pairing module 200, a computational transformation model module 300, an image transformation module 400, and a fusion module 500.

In the embodiment of the present invention, the image preprocessing module 100 is used to obtain original images, and form pre-processed images by performing image rectification and circular edge masking on each original image. The image preprocessing module 100 is also used to perform image enhancement on the pre-processed images to form enhanced images. The image pairing module 200 is used to complete detection and pairing of feature points in the pre-processed images. The computational transformation model module 300 is used to calculate the transformation model of all pre-processed images to the same optimal plane according to the set of feature points. The image transformation module 400 is used to perform projective transformation for each enhanced image separately according to the transformation relation of the transformation model, to transform the coordinate transformed images corresponding to all the enhanced images to the same coordinate system and form a plurality of images to be stitched, and obtain the new coordinate values corresponding to each image to be stitched in the coordinate system. The fusion module 500 is used to stitch the images to be stitched in sequence according to the sequence of corresponding original images obtained in the same coordinate system, and to form a fused image for output.

Preferably, the image preprocessing module 100 is used to implement the function of step S1 in the method for stitching images of the capsule endoscope described above; the image matching module 200 implements the function of step S2; the computational transformation model module 300 implements the function of step S3; the image transformation module 400 implements the function of step S4; and the fusion module 500 implements the function of step S5, which will not be further described herein.

Those skilled in the art can clearly understand that, for the convenience and conciseness of the description, the specific working process of the image stitching system described above will not be repeated as it has been detailed in the foregoing method implementation.

The method for stitching images of the capsule endoscope, electronic device and readable storage medium disclosed in the present invention can stitch multiple images captured consecutively into one image for output, and expand the field of view of a single image of the capsule endoscope.

For the convenience of description, the electronic device is described in various modules divided by functions separately. When implementing the present invention, the functions of the various modules can be implemented in the same or different software and/or hardware.

The device implementations described above are merely illustrative. The modules described as separate components may or may not be physically separated, and the components displayed as modules may or may not be physical modules, that is, they may be located in one place, or may also be distributed over a plurality of network modules. Some or all of the modules may be selected according to actual needs to achieve the object of the embodiment. It can be understood and implemented by ordinary persons skilled in the art without creative work.

It should be understood that, although the specification is described in terms of embodiments, not every embodiment merely comprises an independent technical solution, and the specification is described in this manner only for clarity. Those skilled in the art should have the specification as a whole, and the technical solutions in each embodiment may also be combined as appropriate to form other embodiments that can be understood by those skilled in the art.

The series of detailed descriptions set forth above are only specific descriptions of feasible embodiments of the present invention and are not intended to limit the scope of protection of the present invention. Any equivalent embodiments or modifications made without departing from the spirit of the art of the present invention shall be included within the scope of protection of the present invention.

What is claimed is:

1. A method for stitching images of a capsule endoscope, comprising:

obtaining original images, forming pre-processed images by performing image rectification and circular edge masking on each original image; and performing image enhancement on the pre-processed images to form enhanced images;

completing detection and pairing of feature points in the pre-processed images;

calculating a transformation model of all pre-processed images to a same optimal plane according to a set of the feature points;

performing projective transformation for each enhanced image separately according to a transformation relation of the transformation model, to transform coordinate transformed images corresponding to all the enhanced images to a same coordinate system and form a plurality of images to be stitched, and obtaining new coordinate values corresponding to each image to be stitched in the coordinate system; and stitching the images to be stitched in sequence in the same coordinate system according to the sequence of corresponding original images obtained, and forming a fused image for output;

wherein a non-rigid dense matching method is used to complete the detection and pairing of the feature points in the pre-processed images, the non-rigid dense matching method specifically comprising:

constructing a multi-scale associated image pyramid from bottom up on the basis of correlations of adjacent pre-processed images;

extracting initial feature points from the topmost image of the constructed multi-scale associated image pyramid;

detecting layer by layer from the topmost image of the multi-scale associated image pyramid downward to obtain points corresponding to the initial feature points;

taking the detected points corresponding to the bottommost layer of the multi-scale associated image pyramid as the feature points, and pairing location points corresponding to the feature points in the previous pre-processed image and the next pre-processed image;

wherein constructing the associated image pyramid specifically comprises:

partitioning each two adjacent pre-processed images into $M_1$ non-overlapping square segments of the same size, denoting each segment of the previous pre-processed image by R, and denoting each segment of the next pre-processed image by R', wherein R and R' respectively comprise 4 sub-segments of the same size;

calculating correlations between R and R' in adjacent pre-processed images by formula 1 to obtain an associated image of the bottommost layer, and using the associated image of the bottommost layer as a first sub associated image;

based on the sub associated image of each layer, obtaining the sub associated image of an upper layer by formula 2;

$$sim(R, R') = \frac{1}{M_1^2} \&_{i=0}^{M_1-1} \&_{j=0}^{M_1-1} R_i R_j'; \quad \text{formula 1}$$

$$C_{N,p}(p') = \frac{1}{M_2} \sum_{i=0}^{M_2-1} \max_{m' \in \theta_i} C_{N',p+S_{N,i}}(m'); \quad \text{formula 2}$$

wherein, sim(R, R') denotes the correlation between R and R', $R_i$ denotes an element descriptor corresponding to each sub-segment in the pre-processed image with segment R, $R'_j$ denotes an element descriptor corresponding to each sub-segment in the pre-processed image with segment R', $C_{N,p}(p')$ denotes the correlation between a small element with length N and center point p in the previous pre-processed image and a small element with length N' and center point p' in the next pre-processed image, $\theta_i$ denotes the neighborhood centered at p+$S_{N,i}$ in a selected sub associated image, $Z_{U3p}$ denotes a distance from an i-th neighborhood to the center point p, m' denotes a center point of the neighborhood of the center point p', $M_1$ is the number of square segments of the associated image of the bottommost layer (the first sub associated image), $M_2$ is the number of square segments of the sub associated image of the upper layer, $M_1$, $M_2$, N, and N' are positive integers, and the value of N' is correlated with $M_2$.

2. The method of claim 1, wherein the circular edge masking comprises:
   calculating a distance from each pixel point in the original image after image rectified to the center of the rectified original image;
   determining whether the distance of each pixel point is located in a circle with the center of the rectified original image as the center and r as the radius;
   marking the pixel points in the circle as 1, and marking other pixel points as 0, and forming a circular mask; and
   retaining the pixel points marked as 1 to form a pre-processed image;
   wherein r∈[0.4583L,0.707L], and L denotes the length of the short side of the rectified original image.

3. The method of claim 1, wherein performing image enhancement on pre-processed images to form enhanced images specifically comprises:
   extracting a brightness layer and a detail layer using guided filter in the RGB channels of the pre-processed image, respectively;
   wherein the enhanced image $I_c$ is represented as: $I_c = \alpha_c \times light_c + \beta_c \times detail_c$, c represents a channel, c=[R, G, B], light represents the brightness layer, detail represents the detail layer, and $\alpha_c$ and $\beta_c$ are constants;
   combining the R, G, and B channels to obtain the enhanced image.

4. The method of claim 1, wherein obtaining the element descriptor comprises:
   step T1, performing Gaussian filtering on each pre-processed image with a predetermined Gaussian kernel $r_1$ as a radius, to form an image I_denoise;
   step T2, in the image I_denoise, calculating the gradient of each pixel location point and its projection in F directions, counting the location of each pixel point in a 3*3 neighborhood of each pixel point by the angle of F directions, taking the gradient as the weight of each direction to obtain F-dimensional vector information of each pixel point, weighting the vector information corresponding to the pixel points of each sub-segment to synthesize into the F-dimensional vector information, and using the synthesized F-dimensional vector information as the element descriptor of the current sub-segment;
   step T3, performing Gaussian filtering on each element descriptor with a predetermined Gaussian kernel $r_2$;
   step T4, using Sigmoid function to restrict each element descriptor processed in step T3;
   step T5, assigning a constant value μ for each element descriptor, updating each element descriptor to an F-dimensional grayscale value and the constant value μ, and processing by normalization for the calculation of the first sub associated image.

5. The method of claim 1, wherein after completing the detection and pairing of feature points in the pre-processed images, the method further comprises: eliminating incorrect matching pairs, the eliminated incorrect matching pairs comprising a first eliminating incorrect matching pair; the first eliminating incorrect matching pair specifically comprises:
   finding a previous pre-processed image and a next pre-processed image corresponding thereto based on feature point matching to obtain a first feature matching point corresponding to the feature point in the previous pre-processed image and a second feature matching point corresponding to the feature point in the next pre-processed image, respectively;
   determining whether grayscale values of the first feature matching point and the second feature matching point corresponding to the same current feature point are both within; deter corresponding preset grayscale value ranges mining that the first feature matching point and the second feature matching point corresponding to the current feature point are valid when the grayscale values of the first feature matching point and the second feature matching point corresponding to the same current feature point are both within the corresponding preset grayscale value ranges; determining that the first feature matching point and the second feature matching point corresponding to the current feature point are invalid when the grayscale values of the first feature matching point and the second feature matching point corresponding to the same current feature point are not within the corresponding preset grayscale value ranges at the same time, and eliminating the first feature matching point and the second feature matching point.

6. The method of claim 5, wherein the eliminated incorrect matching pairs further comprising a second eliminating incorrect matching pair; the second eliminating incorrect matching pair specifically comprises: identifying all interior points using RANSAC fitting model, while eliminating exterior points that do not conform to the model.

7. The method of claim 1, wherein after performing projective transformation for each enhanced image separately according to the transformation relation of the transformation model, the method further comprises:
   step N1, constructing a deformation function using a TPS model based on the coordinate transformed images, and calculating an error value between each element in the coordinate transformed image processed by the deformation function and the corresponding element in the coordinate transformed image originally;
   step N2, determining whether the maximum error value in the coordinate transformed image is less than a preset error threshold, marking a current coordinate transformed image as a small error image when the maximum error value in the corresponding coordinate transformed image is less than the preset error threshold, and marking the current coordinate transformed image as a large error image when the maximum error value in the corresponding coordinate transformed image is not less than the preset error threshold;
   step N3, determining whether the percentage of the number of small error images in a total number of all images is less than a preset matching threshold,
   designating the coordinate transformed image as the image to be stitched after deforming the coordinate transformed image using the deformation function constructed by the TPS model when the percentage of the number of small error images in the total number of all images is less than the preset matching threshold;
   designating the coordinate transformed image as the image to be stitched when the percentage of the number of small error images in the total number of all images is not less than the preset matching threshold.

8. The method of claim 7, wherein after the step N3, the method further comprises: projecting the image to be stitched by an equirectangular projection to the optimal projection plane using image interpolation for coordinate information in the image to be stitched to form a new image to be stitched.

9. The method of claim 1, wherein stitching the images to be stitched in sequence in the same coordinate system according to the sequence of corresponding original images obtained and forming the fused image for output specifically comprises:

obtaining previous images to be fused in sequence according to the sequence of original images obtained, with the first image to be fused being the first image to be stitched;

calculating an overlapping area between the image to be stitched that appears after the previous image to be fused and the current image to be fused according to the sequence of original images obtained, retaining pixel values of a non-overlapping area, and updating the pixel values of the overlapping area using formula 3 to form a new previous image to be fused, until the last image to be stitched is fused to the previous image to be fused, to form a final fused image for output;

$$Pix1 = im1\frac{dist1}{dist1 + dist2} + im2\frac{dist2}{dist1 + dist2}, \quad \text{formula 3}$$

wherein, Pix1 represents the pixel value of the overlapping area in the new previous image to be fused after each image fusion or in the final fused image; im1 represents the pixel value of the overlapping area in the previous image to be fused and im2 represents the pixel value of the overlapping area in the next image to be stitched; dist1 represents a distance from a pixel point of the overlapping area in the previous image to be fused to the boundary of the current image to be fused; dist2 represents a distance from the pixel point of the overlapping area in the image to be stitched after the previous image to be fused to the boundary of the current image to be stitched.

10. An electronic device, comprising a storage medium and a processor, wherein the storage medium stores a computer program that can run on the processor and the processor executes the program to implement the steps in a method for stitching images of a capsule endoscope, the method comprising:

obtaining original images, forming pre-processed images by performing image rectification and circular edge masking on each original image; and performing image enhancement on the pre-processed images to form enhanced images;

completing detection and pairing of feature points in the pre-processed images;

calculating a transformation model of all pre-processed images to a same optimal plane according to a set of the feature points;

performing projective transformation for each enhanced image separately according to a transformation relation of the transformation model, to transform coordinate transformed images corresponding to all the enhanced images to a same coordinate system and form a plurality of images to be stitched, and obtaining new coordinate values corresponding to each image to be stitched in the coordinate system; and stitching the images to be stitched in sequence in the same coordinate system according to the sequence of corresponding original images obtained, and forming a fused image for output, wherein a non-rigid dense matching method is used to complete the detection and pairing of the feature points in the pre-processed images, the non-rigid dense matching method specifically comprising:

constructing a multi-scale associated image pyramid from bottom up on the basis of correlations of adjacent pre-processed images;

extracting initial feature points from the topmost image of the constructed multi-scale associated image pyramid;

detecting layer by layer from the topmost image of the multi-scale associated image pyramid downward to obtain points corresponding to the initial feature points;

taking the detected points corresponding to the bottommost layer of the multi-scale associated image pyramid as the feature points, and pairing location points corresponding to the feature points in the previous pre-processed image and the next pre-processed image;

wherein constructing the associated image pyramid specifically comprises:

partitioning each two adjacent pre-processed images into $M_1$ non-overlapping square segments of the same size, denoting each segment of the previous pre-processed image by R, and denoting each segment of the next pre-processed image by R', wherein R and R' respectively comprise 4 sub-segments of the same size, calculating correlations between R and R' in adjacent pre-processed images by formula 1 to obtain an associated image of the bottommost layer, and using the associated image of the bottommost layer as a first sub associated image;

based on the sub associated image of each layer, obtaining the sub associated image of an upper layer by formula 2;

$$sim(R, R') = \frac{1}{M_1^2} \&_{i=0}^{M_1-1} \&_{j=0}^{M_1-1} R_i R'_j; \quad \text{formula 1}$$

$$C_{N,p}(p') = \frac{1}{M_2} \sum_{i=0}^{M_2-1} \max_{m' \in \theta_i} C_{N', p+S_{N,i}}(m'); \quad \text{formula 2}$$

wherein, sim(R, R') denotes the correlation between R and R', $R_i$ denotes an element descriptor corresponding to each sub-segment in the pre-processed image with segment R, $R'_j$ denotes an element descriptor corresponding to each sub-segment in the pre-processed image with segment R', $C_{N,p}(p')$ denotes the correlation between a small element with length N and center point p in the previous pre-processed image and a small element with length N' and center point p' in the next pre-processed image, $\theta_i$ denotes the neighborhood centered at $p+S_{N,i}$ in a selected sub associated image, $Z_{U3p}$ denotes a distance from an i-th neighborhood to the center point p, m' denotes a center point of the neighborhood of the center point p' $M_1$ is the number of square segments of the associated image of the bottommost layer (the first sub associated image), $M_2$ is the number of square segments of the sub associated image of the upper layer, $M_1$, $M_2$, N, and N' are positive integers, and the value of N' is correlated with $M_2$.

11. A computer-readable storage medium that stores a computer program, wherein the computer program is executed by a processor to implement the steps in the method for stitching images of a capsule endoscope, the method comprising:

obtaining original images, forming pre-processed images by performing image rectification and circular edge masking on each original image; and performing image enhancement on the pre-processed images to form enhanced images;

completing detection and pairing of feature points in the pre-processed images;

calculating a transformation model of all pre-processed images to a same optimal plane according to a set of the feature points;

performing projective transformation for each enhanced image separately according to a transformation relation of the transformation model, to transform coordinate transformed images corresponding to all the enhanced images to a same coordinate system and form a plurality of images to be stitched, and obtaining new coordinate values corresponding to each image to be stitched in the coordinate system; and stitching the images to be stitched in sequence in the same coordinate system according to the sequence of corresponding original images obtained, and forming a fused image for output, wherein a non-rigid dense matching method is used to complete the detection and pairing of the feature points in the pre-processed images, the non-rigid dense matching method specifically comprising:

constructing a multi-scale associated image pyramid from bottom up on the basis of correlations of adjacent pre-processed images;

extracting initial feature points from the topmost image of the constructed multi-scale associated image pyramid;

detecting layer by layer from the topmost image of the multi-scale associated image pyramid downward to obtain points corresponding to the initial feature points;

taking the detected points corresponding to the bottommost layer of the multi-scale associated image pyramid as the feature points, and pairing location points corresponding to the feature points in the previous pre-processed image and the next pre-processed image;

wherein constructing the associated image pyramid specifically comprises:

partitioning each two adjacent pre-processed images into $M_1$ non-overlapping square segments of the same size, denoting each segment of the previous pre-processed image by R, and denoting each segment of the next pre-processed image by R', wherein R and R' respectively comprise 4 sub-segments of the same size, calculating correlations between R and R' in adjacent pre-processed images by formula 1 to obtain an associated image of the bottommost layer, and using the associated image of the bottommost layer as a first sub associated image;

based on the sub associated image of each layer, obtaining the sub associated image of an upper layer by formula 2;

$$sim(R, R') = \frac{1}{M_1^2} \&_{i=0}^{M_1-1} \&_{j=0}^{M_1-1} R_i R'_j; \quad \text{formula 1}$$

$$C_{N,p}(p') = \frac{1}{M_2} \sum_{i=0}^{M_2-1} \max_{m' \in \theta_i} C_{N',p+S_{N,i}}(m'); \quad \text{formula 2}$$

wherein, sim(R, R') denotes the correlation between R and R', $R_i$ denotes an element descriptor corresponding to each sub-segment in the pre-processed image with segment R, $R'_j$ denotes an element descriptor corresponding to each sub-segment in the pre-processed image with segment R', $C_{N,p}(p')$ denotes the correlation between a small element with length N and center point p in the previous pre-processed image and a small element with length N' and center point p' in the next pre-processed image, $\theta_i$ denotes the neighborhood centered at $p+S_{N,i}$ in a selected sub associated image, $Z_{U3p}$ denotes a distance from an i-th neighborhood to the center point p, m' denotes a center point of the neighborhood of the center point p' $M_1$ is the number of square segments of the associated image of the bottommost layer (the first sub associated image), $M_2$ is the number of square segments of the sub associated image of the upper layer, $M_1$, $M_2$, N, and N' are positive integers, and the value of N' is correlated with $M_2$.

* * * * *